(12) United States Patent
Sakai et al.

(10) Patent No.: US 6,446,001 B1
(45) Date of Patent: Sep. 3, 2002

(54) NAVIGATION APPARATUS FOR NAVIGATING A VEHICLE BASED ON SYMBOLIC SOUNDS

(75) Inventors: Hideki Sakai; Takashi Takinami, both of Tokyo; Miyuki Matsumoto, Kanagawa; Hiroshi Amano, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/519,211

(22) Filed: Mar. 6, 2000

(30) Foreign Application Priority Data

Mar. 4, 1999 (JP) .......................................... 11-057082

(51) Int. Cl.[7] .............................................. G01C 21/30
(52) U.S. Cl. ...................... 701/211; 701/207; 701/208; 340/996; 381/86
(58) Field of Search ................................ 701/211, 207, 701/208, 209, 210, 213; 340/988, 990, 995, 996, 384.1, 384.3, 384.7; 73/178 R; 381/86, 17, 61, 119, 18, 19

(56) References Cited

U.S. PATENT DOCUMENTS

| | | | | |
|---|---|---|---|---|
| 5,406,492 A | * | 4/1995 | Suzuki | 701/211 |
| 5,515,026 A | * | 5/1996 | Ewert | 340/436 |
| 5,635,925 A | * | 6/1997 | Kishi et al. | 340/996 |
| 5,729,109 A | * | 3/1998 | Kaneko et al. | 318/587 |
| 5,751,228 A | * | 5/1998 | Kamiya et al. | 340/988 |
| 5,809,447 A | * | 9/1998 | Kato et al. | 701/211 |
| 5,826,212 A | * | 10/1998 | Nagai | 701/208 |
| 5,862,229 A | * | 1/1999 | Shimizu | 381/17 |
| 6,016,110 A | * | 1/2000 | Takinami | 340/995 |
| 6,035,253 A | * | 3/2000 | Haysahi et al. | 701/211 |
| 6,061,626 A | * | 5/2000 | Meredith | 701/201 |
| 6,076,041 A | * | 6/2000 | Watanabe | 701/211 |
| 6,128,571 A | * | 10/2000 | Ito et al. | 701/201 |
| 6,144,318 A | * | 11/2000 | Hayashi et al. | 340/995 |
| 6,202,026 B1 | * | 3/2001 | Nimura et al. | 701/211 |

FOREIGN PATENT DOCUMENTS

EP 0829703 12/1996

* cited by examiner

Primary Examiner—Jacques H. Louis-Jacques
(74) Attorney, Agent, or Firm—Jay H. Maioli (57) ABSTRACT

A navigation apparatus includes a command input block from which the user inputs a command signal, a current positional data supply unit, a data reading unit for reading from a CD-ROM map data, voice guidance data, object data about an object displayed on a map of the navigation apparatus, and sound data symbolizing a geographical location corresponding to the object on the map, and a controller for displaying the map and the object onto a display device and sounding the voice guidance and sound data from a speaker.

4 Claims, 6 Drawing Sheets

| OBJECT | EFFECTIVE AREA (DIVIDED BY CIRCLE OR LINE SEGMENT) | SOUND INFORMATION |
|---|---|---|
| MOUNTAIN | 16 | BIRD'S CHIRPING |
| RIVER |  | MURMURING OF RIVER |
| SEA | 17 | SOUND OF TIDAL WAVE |
| RAILROAD STATION | 15 | ROARING OF TRAIN |
| AIRPORT |  | ROARING OF AIRCRAFT |
| TEMPLE | 25 | BOOM OF TEMPLE BELL |
|  |  |  |

| MODE | OUTPUT |
|---|---|
| SYMBOLIC SOUND SELECT MODE | SPECIFIED SYMBOLIC SOUND |
| EVENT SOUND SELECT MODE | SYMBOLIC SOUND REPRESENTATIVE OF EVENT |
| DISTANCE-PROPORTIONAL LEVEL OUTPUT MODE | SYMBOLIC SOUND HAVING SOUND PRESSURE CORRESPONDING TO DISTANCE FROM TARGET OBJECT ON MAP |
| MAXIMUM LEVEL OUTPUT MODE | SYMBOLIC SOUND HAVING THE GREATEST LEVEL AMONG PLURAL SYMBOLIC SOUNDS |
| CONDITIONAL OUTPUT MODE | SYMBOLIC SOUND TO BE OUTPUTTED UNDER PREDETERMINED CONDITION |

NAVIGATION APPARATUS FOR NAVIGATING A VEHICLE BASED ON SYMBOLIC SOUNDS

BACKGROUND OF THE INVENTION

The present invention relates generally to a navigation apparatus for use on a vehicle for navigating it to its destination. More specifically, the present invention relates to a navigation apparatus for navigating a vehicle by means of symbolic sounds in addition to maps and voice messages.

Related-art navigation apparatuses receive signals from a plurality of GPS (Global Positioning System) satellites, detect a current position, and display map data corresponding to the detected current position onto a display device, thereby providing safe and reliable navigation to destination with an additional help of automatic routing capability.

In these navigation apparatuses, the display device displays not only the information directly necessary for navigation but also the correlation between the surroundings in which the vehicle is traveling and such objects displayed on a map of the navigation apparatus as mountain, river or sea for example. Some of these navigation apparatuses additionally provide general geographical and sightseeing information by sounding from a speaker sightseeing guide messages when the vehicle approaches a sightseeing spot for example.

On these related-art navigation apparatuses, the user must keep looking at the display device to search for objects displayed on maps of navigation apparatuses representing the surroundings. It is generally difficult for the user to quickly identify a desired object on a navigator map from many of those sequentially displayed in forms that change as the vehicle travels.

Another shortcoming of these related-art navigation apparatuses lies in that, if, for example, a forest providing a wild-bird habitat or a cliff toward which tidal waves sweep is an object on a navigator map displayed on the display device, and when the vehicle approaches the forest or the cliff, at best a message about it is voiced from the speaker. The user can hear from the speaker no sounds representing the chirping of birds or the sound of waves for example.

SUMMARY OF THE INVENTION

It is therefore an object of the present invention to provide a navigation apparatus capable of correctly informing the user of a current vehicle position by means of symbolic sounds such as naturally sounding bird's chirping and tidal wave sound for example in addition to the normal navigation by means of maps and voiced messages, thereby making the user feel as if put in the natural environment in which the user is driving, making the drive secure and comfortable.

In carrying out the invention and according to one aspect thereof, there is provided a navigation apparatus comprising: a command signal inputting means for inputting a command signal for selecting an operation mode of navigation; a current position detecting means for detecting a current position of a vehicle on which the navigation apparatus is installed and supplying current positional information; a data reading means for reading, from an information storage medium storing map data, voice guidance data, data of an object indicative of a geographical location displayed on a map corresponding to the map data, and sound data symbolizing the geographical location corresponding to the object, the map data, the voice guidance data, the object data, and the sound data, on the basis of the command signal and the current positional information; and a navigation control means for displaying a map corresponding to the map data and an object corresponding to the object data read by the data reading means onto a display device and outputting a voice guidance corresponding to the voice guidance data and a sound corresponding to the sound data from a speaker.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
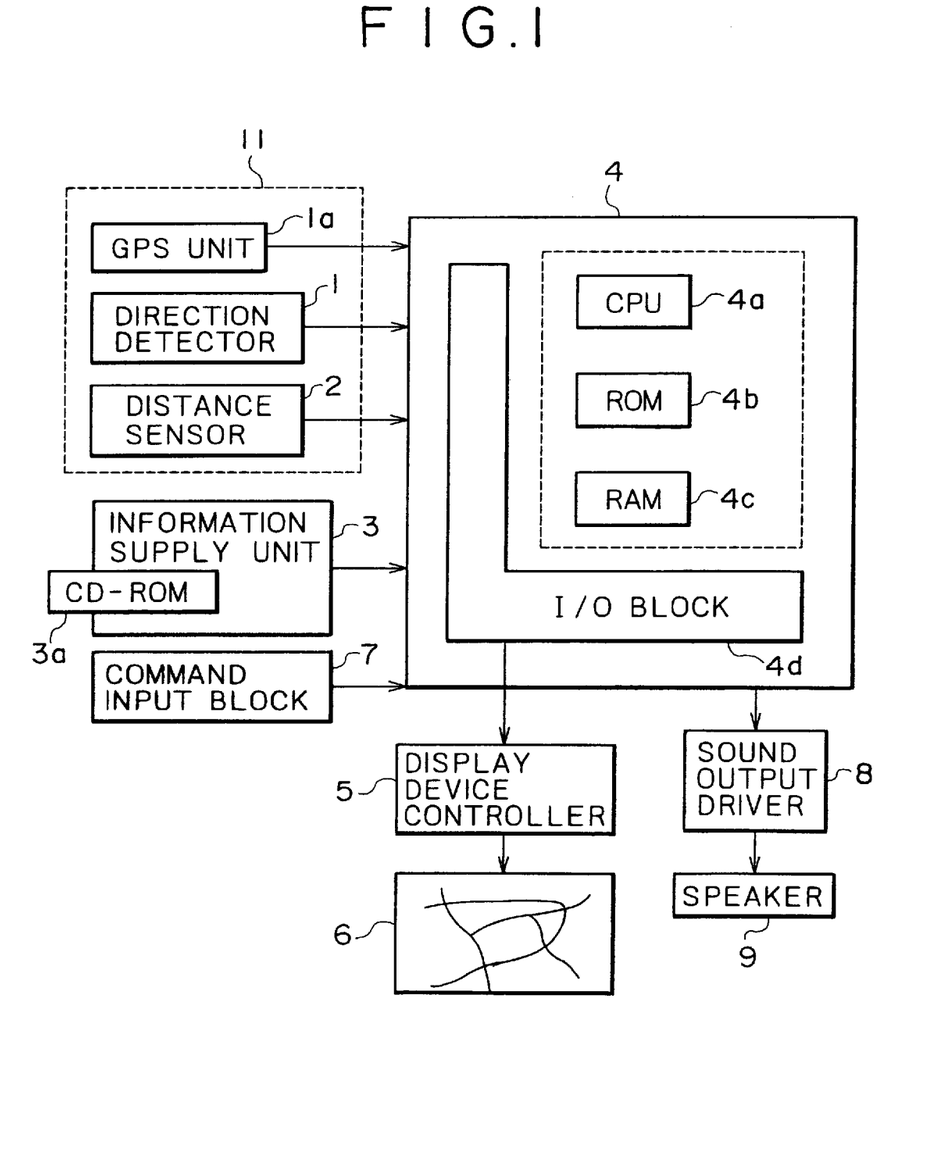
FIG. 1 is a block diagram illustrating a configuration of a navigation apparatus practiced as one preferred embodiment of the invention.
Figure 2:
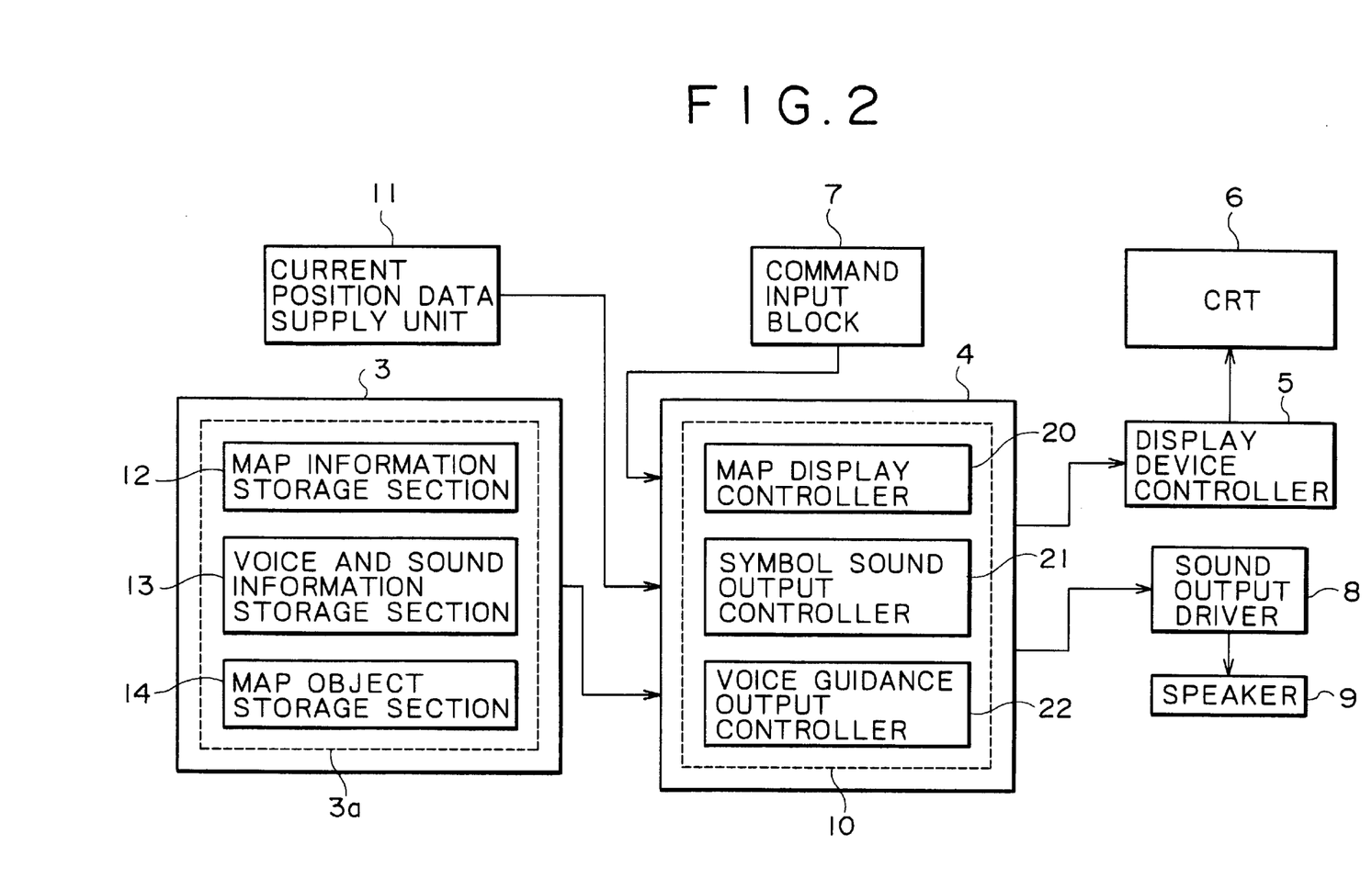
FIG. 2 is a block diagram illustrating the configuration shown in FIG. 1 in detail with emphasis placed on a computation unit and an information supply unit of the embodiment of FIG. 1.

Now, referring to FIGS. 1 and 2, a microcomputer is used as a computation control unit 4 for controlling the entire operation of a navigation apparatus (or a navigator) practiced as one embodiment of the invention. The computation control unit 4 is connected to a command input block 7 through which the user inputs a command signal for selecting a navigation operation mode, a current positional data supply unit 11 for supplying the data associated with the current position of a vehicle on which this navigation apparatus is installed, and an information supply unit 3 for supplying various navigational information.

The computation control unit 4 is also connected to a display device controller 5 for controlling the displaying of navigation images and a sound output driver 8 for controlling the outputting of voice signals of navigation. The display device controller 5 is connected to a display device 6 on which navigation images are displayed. The sound output driver 8 is connected to a speaker 9 from which navigation information is sounded.

The current positional data supply unit 11 has a GPS (Global Positioning System) unit 1a for detecting a current position on the basis of signals sent from a plurality of GPS satellites, a direction detector 1 for detecting a direction in which the vehicle is traveling relative to geomagnetism component, and a distance sensor 2 for detecting a travel distance by outputting a distance pulse for each unit travel distance.

The information supply unit 3 is loaded with a CD-ROM (Compact Disc Read Only Memory) 3a which stores navigational information. The CD-ROM 3a has a map information storage section 12 for storing map information for navigation, a voice and sound information storage section 13 for storing voice guidance information and symbolic sound information, and a map object storage section 14 for storing the image information of the objects on the map.

A symbolic sound herein denotes such a sound heard in a real places corresponding to an object displayed on a map of the navigation apparatus as bird's chirping, murmuring of river stream, sound of tidal wave, roaring of train and aircraft, or boom of temple bell for example.

Figure 3:
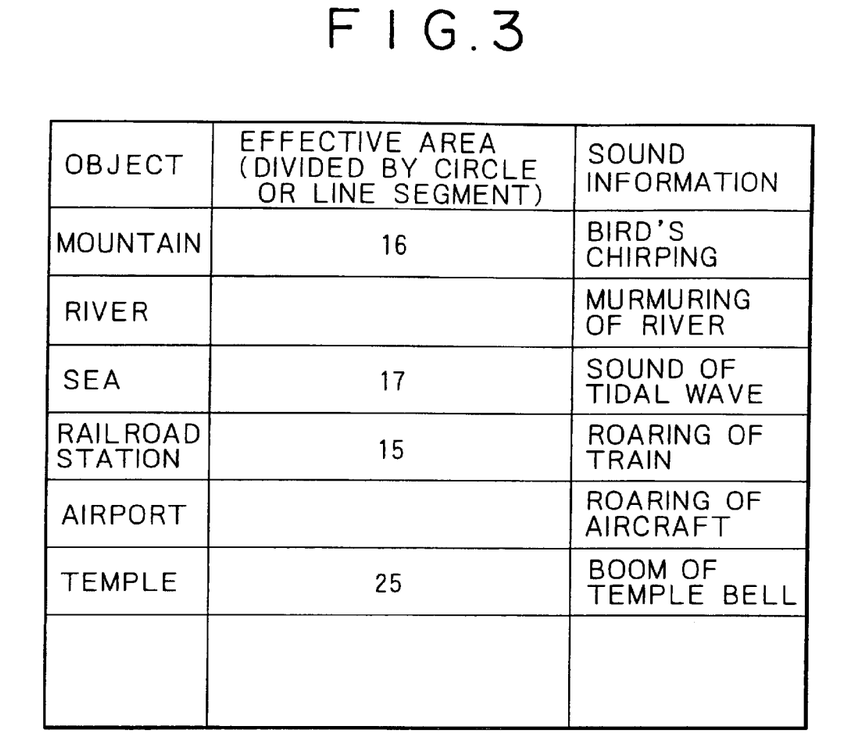
FIG. 3 illustrates a data file containing data of objects displayed on a map of the navigation apparatus and data of sounds heard in real places corresponding to objects on the map, this data file being for use in the embodiment of FIG. 1.

The map object storage section 14 stores data of the such objects on the map as mountain, river, sea, railroad station, airport, and temple for example as well as regional data of the objects on the map as represented by circle or line segment sequence as shown in FIG. 3. The voice and sound information storage section 13 stores voice guidance data and symbolic sounds. The map information storage section 12 stores the map image data for use in navigation.

The computation control unit 4 has a CPU (Central Processing Unit) 4a, a ROM (Read Only Memory) 4b, and a RAM (Random Access Memory) 4c, a controller 10 for controlling navigation operations, and an I/O (Input/Output) block 4d for providing interface with the outside of the computation control unit 4. The controller 10 has a map display controller 20 for controlling a map image display operation, a symbol sound output controller 21 for controlling a sound output operation, and a voice guidance output controller 22 for controlling a voice guidance output operation.

From the command input block 7, the user inputs a command signal for selecting a navigation operating mode. In addition to a normal navigation mode, the present embodiment allows the user to select, by inputting another command signal, a symbolic sound output navigation mode. When the symbolic sound output navigation mode is selected, as shown in FIG. 7, the user can further select a symbolic sound specification mode, an event sound select mode, a distance-proportional level output mode, a maximum level output mode, and a conditional output mode.

In the above-described symbol sound output navigation mode, a symbolic sound representing an approaching mountain, river, or sea for example corresponding to an object on the map is outputted from the speaker 9.

Figure 7:
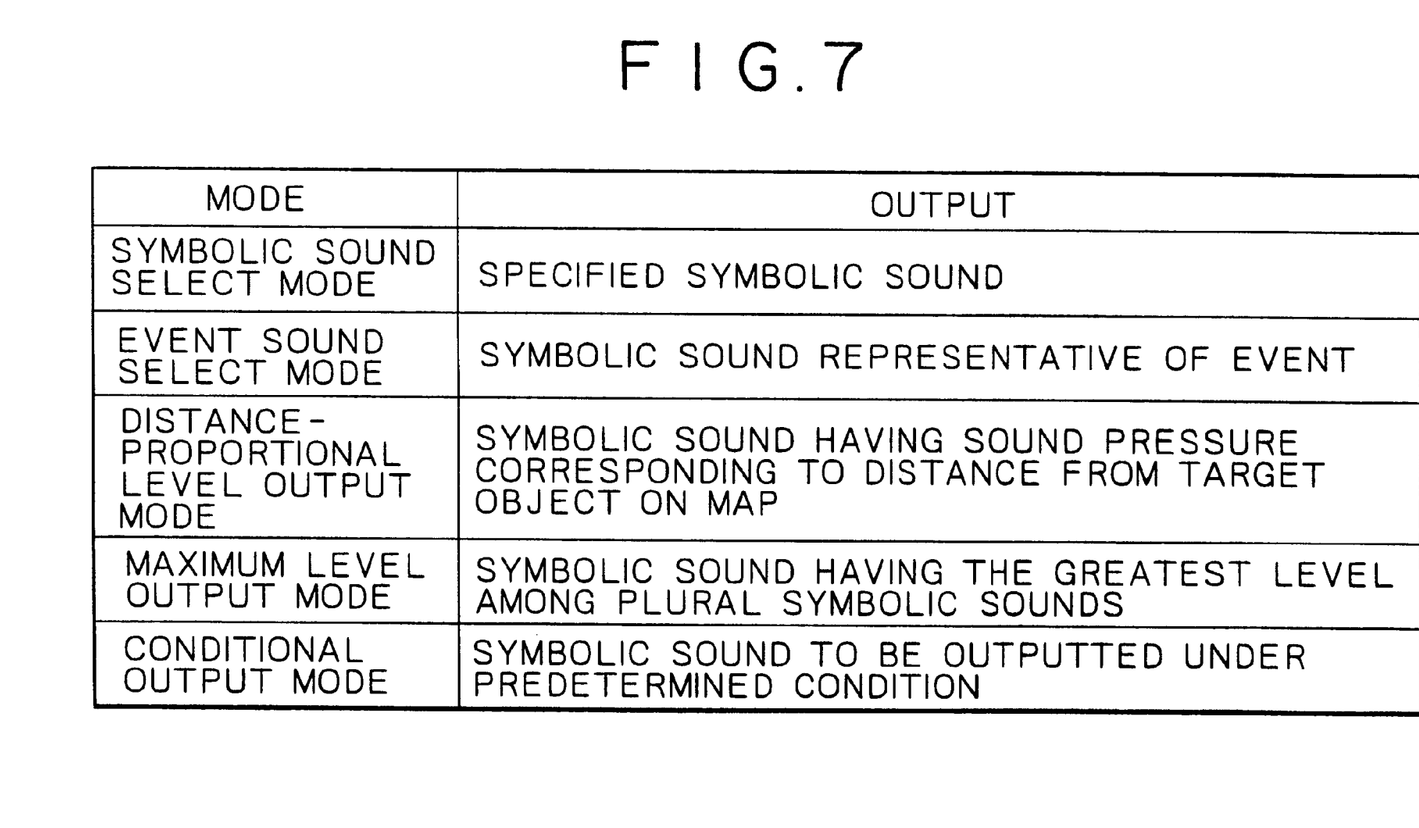
FIG. 7 is a list of modes which are further selectable after a simulated sound select mode is selected.

As described, selection of the symbol sound output navigation mode allows further selections as shown in FIG. 7. When the symbolic sound specification mode is selected, only a specified symbolic sound, a sound of tidal wave for example, is outputted. When the event sound select mode is selected, a symbolic sound representing a festival for example in a location corresponding to an object on the map is outputted during the period of the festival for example.

When the distance-proportional output level mode is selected, a symbolic sound having a sound level corresponding to the distance to a location represented by an object on the map is outputted. When the maximum level output mode is selected, the symbolic sound having the greatest level among a plurality of symbolic sounds is outputted.

When the conditional output mode is selected, a symbol sound is outputted under a predetermined condition. For example, when driving along a beach, if the constant output of the symbolic sound of tidal wave is a nuisance, the user set the condition so that the symbolic sound is outputted only for the first predetermined time.

The following describes a navigating operation of the above-mentioned preferred embodiment of the invention.

Figure 5:
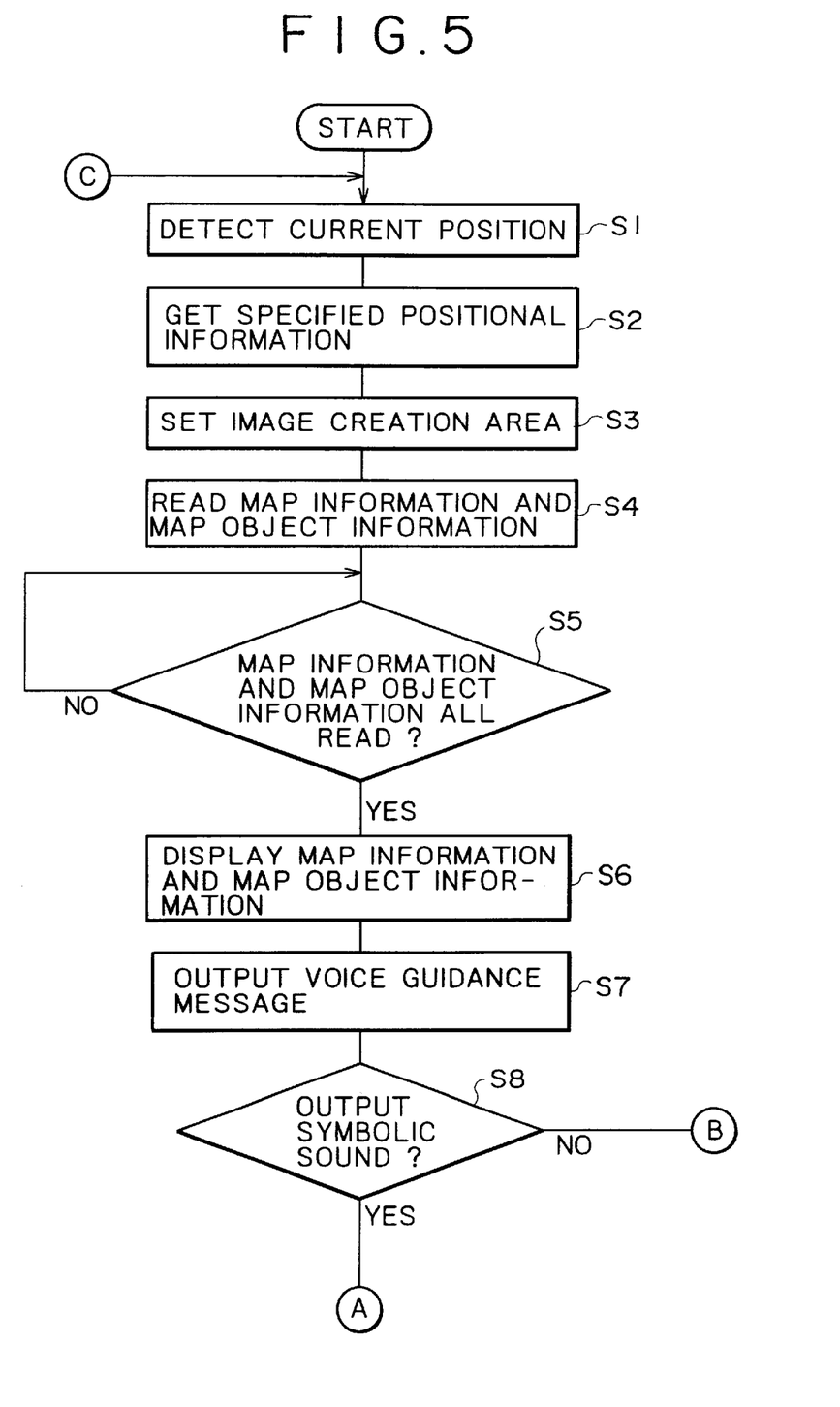
FIG. 5 is a flowchart indicative of the first half of the navigation control operation of the embodiment of FIG. 1.

Now, referring to FIG. 5, in step S1, the GPS unit 1a detects current positional information supplied from GPS satellites. The direction detector 1 detects a vehicle travel direction on the basis of vehicle travel direction information relative to geomagnetism component. The distance sensor 2 detects a vehicle travel distance. The current position data supply unit 11 supplies current positional data composed of the current positional information, the vehicle travel direction, and the vehicle travel distance from the GPS satellites to the computation control unit 4, the current positional data then being stored in the RAM 4c. In step S2, specified positional information inputted from the command input block 7 is supplied to the computation control unit 4 to be stored in the RAM 4c.

In step S3, according to a command given by the CPU 4a of the computation control unit 4 and on the basis of the current positional data and the specified positional information read from the RAM 4c, an image creation area to be displayed on the display device 6 is set. In step S4, map image data corresponding to this image creation area are read from the map information storage section 12 of the information supply unit 3. Map object data corresponding to the image creation area are read from the map object storage section 14. In step S5, the CPU 4a determines whether the reading of the map image data and the map object data has been completed.

If the decision is yes, then, in step S6, the map display controller 20 of the computation control unit 4 drives the display device controller 5, thereby displaying the map information and the map object information onto the display device 6. In step S7, voice guidance message data are read from the voice and sound information storage section 13 of the information supply unit 3. The voice guidance output controller 22 of the computation control unit 4 drives the sound output driver 8 to sound a voice guidance message "Turn right at the next traffic light, 10 km to city H" for example from the speaker 9.

Next, in step S8, the CPU 4a of the computation control unit 4 determines whether a command signal for selecting the symbolic sound output navigation mode has been inputted from the command input block 7. If the decision is yes, then, in step S9 of FIG. 6, a symbolic sound output condition is obtained on the basis of the mode selected from the command input block 7.

Figure 6:
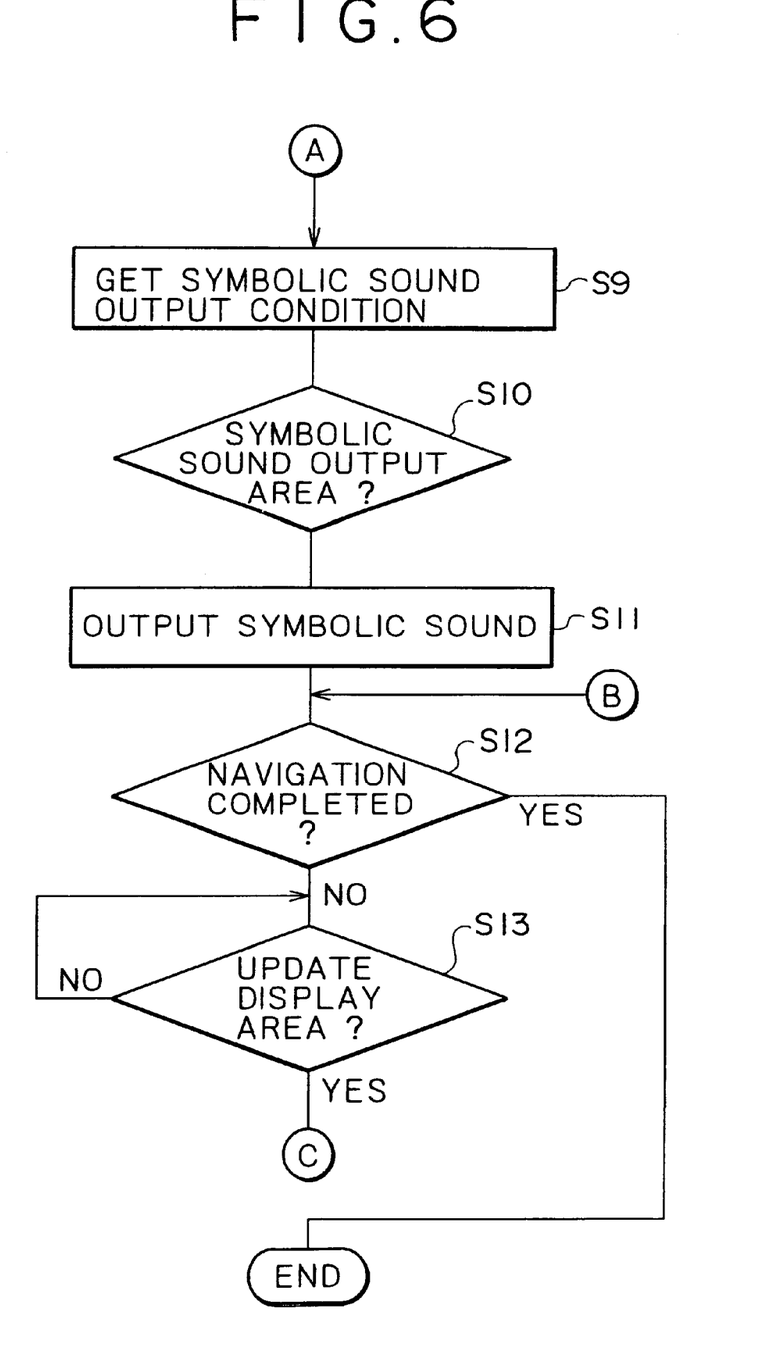
FIG. 6 is a flowchart indicative of the last half of the navigation control operation of the embodiment of FIG. 1.

In step S10, the CPU 4a determines whether the current vehicle position is within the preset symbolic sound output area relative to a target object on the map. If the decision is yes, the corresponding symbolic sound data are read from the voice and sound information storage section 13 of the information supply unit 3 in step S11. Then, the symbol sound output controller 21 of the computation control unit 4 drives the sound output driver 8 to output the symbolic sound representative of the target object on the map from the speaker 9 on the basis of the selected navigation mode.

For example, assume that there are two or more objects on the map and the user selects the symbolic sound output navigation mode through the command input block 7 with a symbolic sound specification mode for selecting only a sound indicative of sea and an event sound select mode for the festival of a certain temple H already inputted.

Figure 4:
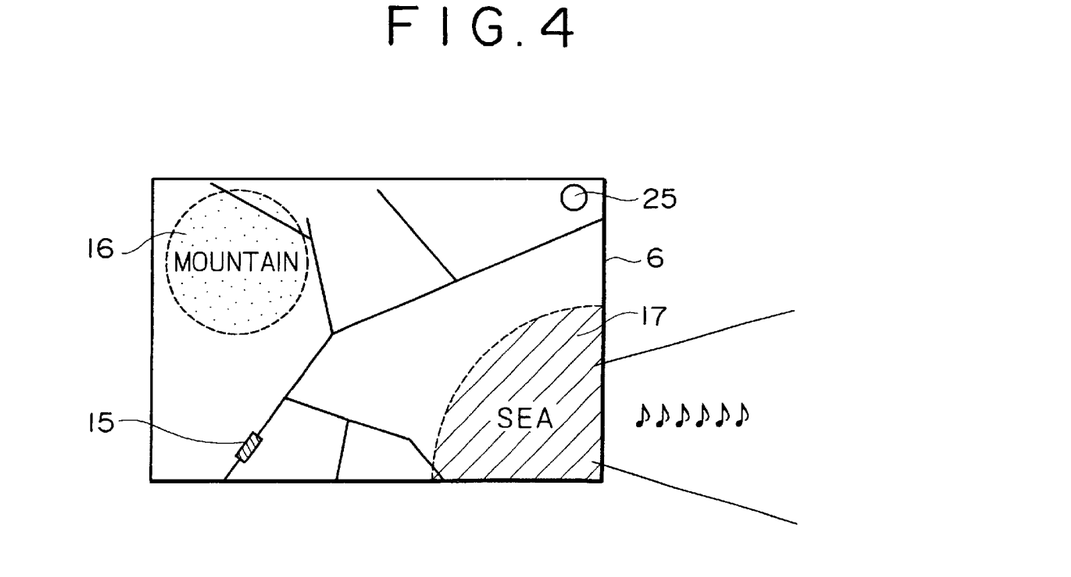
FIG. 4 is a diagram illustrating one example of a navigation control operation in the embodiment of FIG. 1.

In this example, as shown in FIG. 4, when a current vehicle position 15 enters the symbolic sound area of a mountain area 16 or a sea area 17, tidal wave sound data are read from the voice and sound information storage section 13 to be sounded from the speaker 9. When the vehicle travels further and enters the symbolic sound output area of temple H 25 and if it is in a festival period, the event sound data of the temple H 25 are read from the voice and sound information storage section 13 to be sounded from the speaker 9.

In step S12 of FIG. 6, the CPU 4a of the computation control unit 4 determines whether the navigating operation has been completed. If the navigating operation is found still going on, then, in step S13, the CPU 4a determines whether it is necessary to update the display area. If the decision is yes, then, back to step S1 of FIG. 5, the CPU 4a repeats the above-mentioned processing until the navigating operation is completed in step S12.

As described and according to the preferred embodiment of the invention, in a normal navigating operation, a map image is displayed on the display device 6, a voice guidance message is voiced from the speaker 9, thereby navigating the vehicle to a target location. If the user selects the symbolic sound output navigation mode through the command input block 7 and selects one of particular sound output modes, the selected symbolic sound indicative of the target object on the map is sounded from the speaker 9.

In the above-mentioned example, when the vehicle enters a predetermined range of a target object on the map, the symbolic sound data corresponding to the target object are read from the voice and sound information storage section 13. Then the symbol sound output controller 21 drives the sound output driver 8 to sound the symbolic sound data from the speaker 9 as bird's chirping or tidal wave sound for example.

Consequently, the novel constitution allows the user to be correctly informed of a current vehicle position by means of symbolic sounds such as naturally sounding bird's chirping and tidal wave sound for example in addition to maps and voice messages. The user hears the outputted symbolic sounds and feels as if put in the natural environment that symbolizes the current vehicle location for a secure and comfortable drive.

In the above-mentioned embodiment, the symbolic sound specification mode was specified to select a tidal wave sound which is sounded when the vehicle enters areas of two or more objects on the map. It will be apparent to those skilled in the art that the present invention is not limited thereto; rather, the user can also select the distance-proportional level output mode to sound a symbolic sound having a sound pressure corresponding to the distance from a target object on the map or the maximum level output mode to sound a symbolic sound having the greatest level among plural symbolic sounds. In addition, the user can select the conditional output mode to sound a symbolic sound under a predetermined condition; for example, when driving along a beach, a tidal wave sound may be sounded only for a first predetermined time rather than constantly sounding during the drive along the beach.

While the preferred embodiments of the present invention have been described using specific terms, such description is for illustrative purposes only, and it is to be understood that changes and variations may be made without departing from the spirit or scope of the appended claims.

What is claimed is:

1. A navigation apparatus installed on a vehicle, the apparatus comprising:

command signal inputting means for inputting a command signal to select an operation mode of navigation;

current position detecting means for detecting a current position of the vehicle on which said navigation apparatus is installed and supplying current positional information;

data reading means for reading voice guidance data, object data indicative of a geographical location, sound data symbolizing a feature of said geographical location, and map data from an information storage medium storing said map data in response to said command signal and said current positional information; and navigation control means for displaying said map data and said object data read by said data reading means onto a display device and for outputting a voice guidance corresponding to said voice guidance data and outputting audible sounds to a user of the apparatus through a speaker when said vehicle is within a predetermined distance of said geographical location, said audible sounds corresponding to said sound data symbolizing a feature of said geographical location.

2. The navigation apparatus according to claim 1, wherein said navigation control means sets an output level of said sound in accordance with a distance to said object.

3. A navigation apparatus installed on a vehicle, the apparatus comprising:

command signal inputting means for inputting a command signal to select an operation mode of navigation;

current position detecting means for detecting a current position of the vehicle on which said navigation apparatus is installed and supplying current positional information;

data reading means for reading voice guidance data, object data indicative of a geographical location, sound data symbolizing a feature of said geographical location, and map data from an information storage medium storing said map data in response to said command signal and said current positional information; and navigation control means for displaying said map data and said object data read by said data reading means onto a display device and for outputting a voice guidance corresponding to said voice guidance data and outputting audible sounds to a user of the apparatus through a speaker when said vehicle is within a predetermined distance of said geographical location, said audible sounds corresponding to said sound data symbolizing a feature of said geographical location, wherein said navigation control means includes means for determining if a duration of time in which said sound is continuously outputted exceeds a predetermined reference time and for outputting said sound under a predetermined condition.

4. A navigation apparatus installed on a vehicle, the apparatus comprising:

command signal inputting means for inputting a command signal to select an operation mode of navigation;

current position detecting means for detecting a current position of the vehicle on which said navigation apparatus is installed and supplying current positional information;

data reading means for reading voice guidance data, object data indicative of a geographical location, sound data symbolizing a feature of said geographical location, and map data from an information storage medium storing said map data in response to said command signal and said current positional information; and navigation control means for displaying said map data and said object data read by said data reading means onto a display device and for outputting a voice guidance corresponding to said voice guidance data and outputting audible sounds to a user of the apparatus through a speaker when said vehicle is within a predetermined distance of said geographical location, said audible sounds corresponding to said sound data symbolizing a feature of said geographical location, wherein said navigation control means includes means for determining if a duration of time in which said sound is continuously outputted exceeds a predetermined reference time and for outputting said sound only for said predetermined reference time.

* * * * *